US011816172B2

(12) United States Patent
Zhong

(10) Patent No.: US 11,816,172 B2
(45) Date of Patent: Nov. 14, 2023

(54) DATA PROCESSING METHOD, SERVER, AND COMPUTER STORAGE MEDIUM

(71) Applicant: TENCENT TECHNOLOGY (SHENZHEN) COMPANY LIMITED, Shenzhen (CN)

(72) Inventor: Peimin Zhong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 225 days.

(21) Appl. No.: 16/411,871

(22) Filed: May 14, 2019

(65) Prior Publication Data

US 2019/0266206 A1    Aug. 29, 2019

Related U.S. Application Data

(63) Continuation of application No. PCT/CN2018/084664, filed on Apr. 26, 2018.

(30) Foreign Application Priority Data

May 10, 2017    (CN) .......................... 201710326633.5

(51) Int. Cl.
*G06F 16/00* (2019.01)
*G06F 16/9535* (2019.01)
(Continued)

(52) U.S. Cl.
CPC .......... *G06F 16/9535* (2019.01); *G06F 16/00* (2019.01); *G06F 16/2365* (2019.01);
(Continued)

(58) Field of Classification Search
CPC ................ G06F 16/9535; G06F 16/00; G06F 16/24568; G06F 16/2465; G06F 16/2365; G06F 2216/03
(Continued)

(56) References Cited

U.S. PATENT DOCUMENTS 6,021,403 A * 2/2000 Horvitz ................... G06F 9/453
706/45
7,177,853 B1 * 2/2007 Ezra ..................... G06F 12/0871
(Continued)

FOREIGN PATENT DOCUMENTS

CN         102075851 A        5/2011
CN         105447186 A   *    3/2016
(Continued)

OTHER PUBLICATIONS

International Search Report for corresponding PCT/CN2018/084664, dated Jul. 3, 2018. Partial English translation provided.
(Continued)

*Primary Examiner* — Irete F Ehichioya
*Assistant Examiner* — Shirley D Hicks
(74) *Attorney, Agent, or Firm* — ARENTFOX SCHIFF LLP

(57) ABSTRACT

This application describes a data processing method, a server, and a computer storage medium. In a method, a real-time data stream is collected. The real-time data stream includes a plurality of usage data for a plurality of content. Each of the plurality of usage data is associated with (i) content identification information of a respective one of the plurality of content and (ii) a time stamp of the respective usage data and indicating one of a plurality of user actions that is performed on the respective one of the plurality of content. Further, each of the plurality of user actions is associated with an action weight. A user status queue is generated according to the plurality of usage data and the associated content identification information. A user status feature is determined. Recommended information is determined according to the user status feature and is sent to a user terminal.

20 Claims, 6 Drawing Sheets

(51) Int. Cl.
  *G06F 16/2455* (2019.01)
  *G06F 16/2458* (2019.01)
  *G06F 16/23* (2019.01)

(52) U.S. Cl.
  CPC .... *G06F 16/2465* (2019.01); *G06F 16/24568* (2019.01); *G06F 2216/03* (2013.01)

(58) Field of Classification Search
  USPC .................................................. 707/600–899
  See application file for complete search history.

(56) References Cited

U.S. PATENT DOCUMENTS

| | | | |
|---|---|---|---|
| 8,762,302 B1 | 6/2014 | Spivack et al. | |
| 2003/0163644 A1* | 8/2003 | Hoang | G06F 12/128 |
| | | | 711/134 |
| 2006/0106960 A1* | 5/2006 | Hickson | G06F 7/785 |
| | | | 710/52 |
| 2014/0277735 A1* | 9/2014 | Breazeal | H04N 5/23206 |
| | | | 700/259 |
| 2016/0086222 A1* | 3/2016 | Kurapati | G06Q 40/08 |
| | | | 705/14.53 |
| 2016/0360382 A1* | 12/2016 | Gross | G06F 3/04883 |
| 2017/0019836 A1* | 1/2017 | Bird | H04L 47/624 |

FOREIGN PATENT DOCUMENTS

| | | |
|---|---|---|
| CN | 105447186 A | 3/2016 |
| CN | 105469263 A | 4/2016 |

OTHER PUBLICATIONS

Written Opinion for corresponding PCT/CN2018/084664, dated Jul. 3, 2018.

* cited by examiner

| No. | 1 | 2 | 3 |
|---|---|---|---|
| Behavior content | News 1: exposed | News 2: exposed | News 3: exposed |
| Occurrence time | November 29, 2016 13:45:54 | November 29, 2016 13:45:54 | November 29, 2016 13:46:14 |

A1

| No. | 1 | 2 | 3 |
|---|---|---|---|
| Behavior content | News 1: exposed | News 2: exposed | News 3: exposed |
| Occurrence time | November 29, 2016 13:45:54 | November 29, 2016 13:45:54 | November 29, 2016 13:46:14 |

A2

| News 4: exposed |
|---|
| November 29, 2016 13:46:16 |

⇒

| No. | 1 | 2 | 3 | 4 |
|---|---|---|---|---|
| Behavior content | News 1: exposed | News 2: exposed | News 3: exposed | News 4: exposed |
| Occurrence time | November 29, 2016 13:45:54 | November 29, 2016 13:45:54 | November 29, 2016 13:46:14 | November 29, 2016 13:46:16 |

| No. | 1 | 2 | 3 | 4 |
|---|---|---|---|---|
| Behavior content | News 1: exposed | News 2: exposed | News 3: exposed | News 4: exposed |
| Occurrence time | November 29, 2016 13:45:54 | November 29, 2016 13:45:54 | November 29, 2016 13:46:14 | November 29, 2016 13:46:16 |

A4

| News 3: exposed |
|---|
| November 29, 2016 13:46:20 |

⇒

| No. | 1 | 2 | 3 | 4 |
|---|---|---|---|---|
| Behavior content | News 1: exposed | News 2: exposed |  | News 4: exposed |
| Occurrence time | November 29, 2016 13:45:54 | November 29, 2016 13:45:54 |  | November 29, 2016 13:46:16 |

FIG. 8

| No. | 1 | 2 | 3 | 4 |
|---|---|---|---|---|
| Behavior content | News 1: exposed | News 2: exposed | News 4: exposed |  |
| Occurrence time | November 29, 2016 13:45:54 | November 29, 2016 13:45:54 | November 29, 2016 13:46:16 |  |

FIG. 9

DATA PROCESSING METHOD, SERVER, AND COMPUTER STORAGE MEDIUM

RELATED APPLICATION

This application is a continuation of International Application No. PCT/CN2018/084664, filed on Apr. 26, 2018, which claims priority to China Patent Application No. 201710326633.5, entitled "DATA PROCESSING METHOD, SERVER, AND COMPUTER STORAGE MEDIUM," and filed on May 10, 2017. The entire disclosures of the prior applications are hereby incorporated by reference in their entirety.

FIELD OF THE TECHNOLOGY

This application relates to a data processing method, a server, and a computer storage medium.

BACKGROUND OF THE DISCLOSURE

Companies can benefit from finding out information that a user is interested in to and provide services for the user based on the information that the user is concerned about. Obtaining this type of information is the current developmental trend in information mining. For example, in an information mining process, a user status (such as a current interest or preference of the user) may be analyzed.

Currently, the user status is captured and analyzed according to a fixed-period selection mechanism. Accordingly, it is difficult to capture the user status precisely because the user status changes fast and has an element of randomness. Therefore, recommended information cannot be provided for the user precisely.

How to precisely obtain and describe the user status is a technical problem to be resolved. However, there is no effective solution in the related technology.

SUMMARY

In view of this, embodiments of this application provide a data processing method, a server, and a computer storage medium, which at least resolve the problem in the related technology.

In an embodiment of present disclosure, a data processing method is provided. In the method, a real-time data stream is collected. The real-time data stream includes a first-type data representing a plurality of behaviors of a user and a second-type data representing information of interest to the user. A user status queue is generated according to the first-type data and the second-type data. User status changes are tracked in real time according to the user status queue and time information that indicates when the first-type data is generated by the user performing at least an action relating to the second-type data to determine a user status feature to determine a user status feature. Recommended information is determined according to the user status feature, and the recommended information is sent to a user terminal.

In an embodiment of present disclosure, a server is provided. The server includes circuitry. The circuitry is configured to collect real-time data stream. The real-time data stream includes a first-type data representing a plurality of behaviors of a user and a second-type data representing information of interest to the user. The circuitry is further configured to generate a user status queue according to the first-type data and the second-type data. The circuitry is further configured to track changes of a user status in real time according to the user status queue and time information that indicates when the first-type data is generated by the user performing at least an action relating to the second-type data to determine a user status feature. The circuitry is further configured to determine recommended information according to the user status feature. The circuitry is further configured to send the recommended information to a user terminal.

In an embodiment of the present disclosure, a non-transitory computer readable medium storing a computer program executable by a process to perform a data processing method is provided. In the method, a real-time data stream is collected. The real-time data stream includes a first-type data representing a plurality of behaviors of a user and a second-type data representing information of interest to the user. A user status queue is generated according to the first-type data and the second-type data. User status changes are tracked in real time according to the user status queue and time information that indicates when the first-type data is generated by the user performing at least an action relating to the second-type data to determine a user status feature to determine a user status feature. Recommended information is determined according to the user status feature, and the recommended information is sent to a user terminal.

In an embodiment of the present disclosure, a server is provided. The server includes a memory configured to store a computer program running on a processor and a processor configured to perform the method according to any of the foregoing methods when running the computer program.

In an embodiment of present disclosure, a data processing method is provided. The method is performed by a server. The server comprises one or more processors, a memory, and one or more programs. The one or more programs comprise one or more units that each corresponds to one group of instructions. The one or more processors are configured to execute the instructions according to the foregoing methods.

The data processing method according to the embodiments of this application includes: collecting, by a server, a real-time data stream, the real-time data stream including a first-type data representing a plurality of behaviors of a user and a second-type data representing information of interest to the user; generating a user status queue according to the first-type data and the second-type data; tracking changes of a user status in real time according to the user status queue and time information that indicates when the first-type data is generated by the user performing at least an action relating to the second-type data to determine a user status feature; determining recommended information according to the user status feature; and sending the recommended information to a user terminal.

By using the embodiments of this application, a real-time data stream is collected. A user status queue is established/generated according to the real-time data stream. User status changes are tracked in real time according to the user status queue and time information that indicates when the first-type data is generated by the user performing at least an action relating to the second-type data to determine a user status feature to determine a user status feature to obtain a user status feature, thereby dynamically grasping (for example, tracking each user status in the queue) user status changes (such as a dynamic time window) in real time (for example, based on the real-time data stream). A user status corresponding to a moment or a user status change corresponding to a relatively short period of time can be positioned precisely. Even though the user status changes fast and has an element of randomness, the user status can still be captured precisely, thereby providing recommended information for a user precisely, and providing more precise related services for the user.

BRIEF DESCRIPTION OF THE DRAWINGS

FIG. 7 is a schematic diagram of a user status queue according to an embodiment of the present disclosure;

FIG. 8 is a schematic diagram of a user status queue according to an embodiment of the present disclosure;

FIG. 9 is a schematic diagram of a user status queue according to an embodiment of the present disclosure;

DESCRIPTION OF EMBODIMENTS

Figure 1:
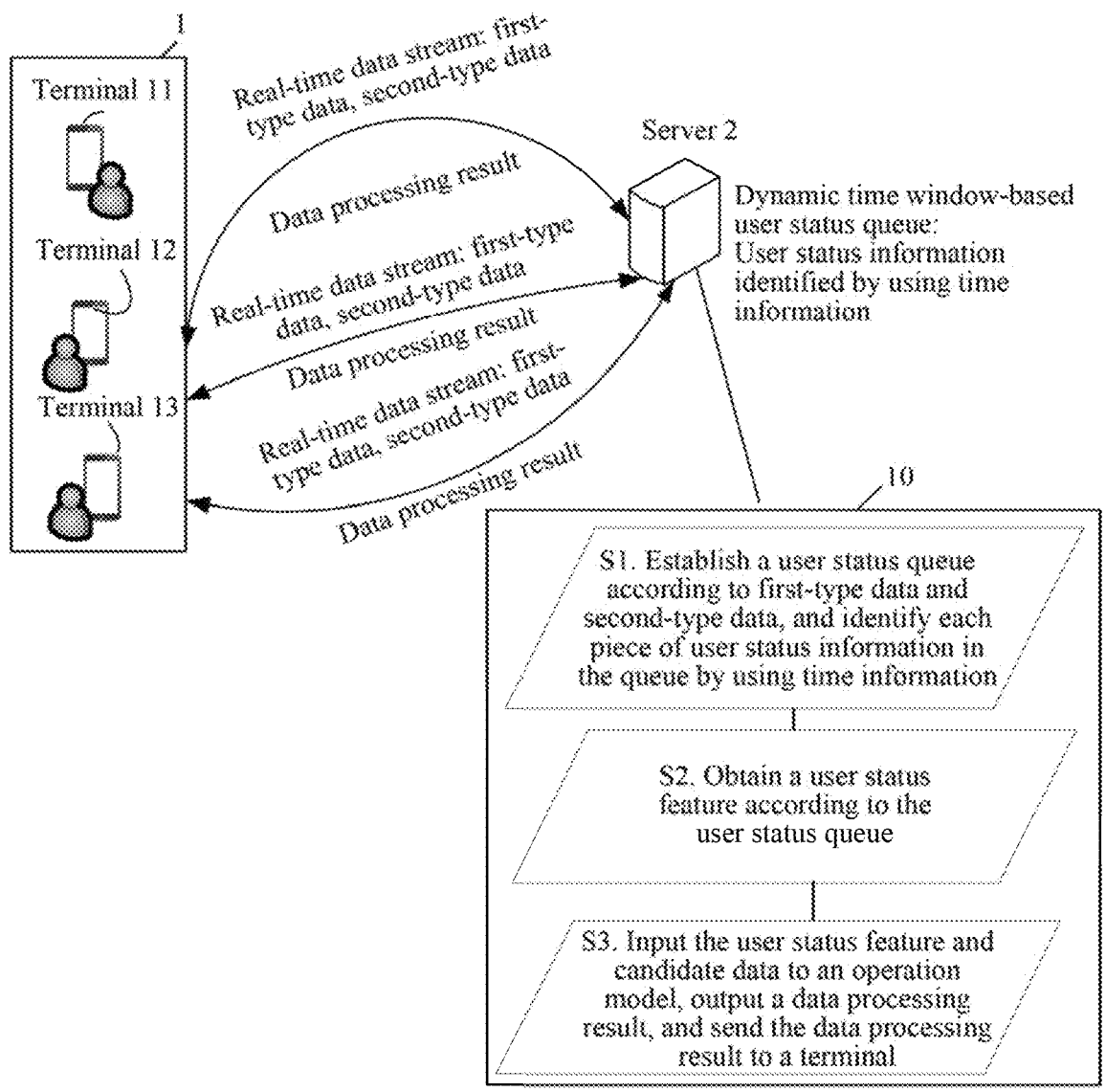
FIG. 1 is a schematic diagram of hardware entities performing information interaction in an embodiment of the present disclosure.

Implementations of technical solutions are described in further detail with reference to the accompanying drawings.

A mobile terminal for implementing the embodiments of this application is described with reference to the accompanying drawings. In the following description, suffixes such as "module," "component" or "unit" for representing elements are used for facilitating illustration of the embodiments of this application. Therefore, the "module" and "component" can be mixed in use.

In the following detailed illustration, specific details are stated, so that this application can be understood thoroughly. However, for a person of ordinary skill in the art, obviously, this application can be practiced without these specific details. In other cases, well-known methods, processes, assemblies, circuits, and networks are not described in detail, to avoid making various aspects of the embodiments obscure.

In addition, although terms such as "first" and "second" are used many times in this specification for describing various elements (or various thresholds, various applications, various instructions, or various operations), the elements (or thresholds, applications, instructions, or operations) are not be limited by the terms. The terms are used for distinguishing one element (or threshold, application, instruction, or operation) from another element (or threshold, application, instruction, or operation). For example, a first operation may also be referred to as a second operation, and a second operation may also be referred to as a first operation without departing from the scope of this application. The first operation and the second operation are both operations, except that the operations are different.

Steps in the embodiments of this application are not necessarily processed according to the step order described. The steps may be re-ordered selectively according to a requirement, a step in the embodiments may be deleted, and a step may be added to the embodiments. The order of the steps described in the present disclosure is an example and does not represent all step order combinations in the embodiments of this application. The step order in the embodiments may not be considered as a limitation on this application.

The term "and/or" in the embodiments of this application refers to one of or any or all possible combinations of a plurality of associated items listed. It is be further noted that, when used in this specification, "include/comprise" refers to the existence of the stated feature, integer, step, operation, element, and/or combination, but does not exclude the existence or addition of one or a plurality of other features, integers, steps, operations, elements, and/or combinations, and/or a group thereof.

An intelligent terminal (such as a mobile terminal) in the embodiments of this application may be implemented in various forms. For example, the mobile terminal described in the embodiments of this application may include mobile terminals such as mobile phone, a smart phone, a notebook computer, a digital broadcasting receiver, a personal digital assistant (PDA), a tablet computer (PAD), a portable media player (PMP), and a navigation apparatus, and fixed terminals such as digital TV and a desktop computer. In the following, it is assumed that the terminal is a mobile terminal. However, a person skilled in the art can understand that, in addition to being specifically used for mobile elements, a structure according to the implementations of this application can also be used in fixed-type terminals.

With the popularization of the Internet, interaction of various kinds of information can be conveniently performed between users through the Internet. The collection of information that a user is concerned about is highly advantageous because this information leads to the provision of more related services to the user. For example, in an information mining process, information such as a user status may be analyzed. The user status refers to a current interest and preference of the user, and generally changes fast and has certain randomness. If the user status can be captured precisely, precise services can be provided for the user.

Because the user status generally changes fast and has an element of randomness, it is difficult to precisely capture the user status by using the current information mining technologies, and therefore, precise recommended information cannot be provided for the user. One method is to establish a user image by using a historical behavior data of the user over a fixed period of time. However, the user image refers to long-term interests and preferences of the user, and can only describe interests and preferences that tend to be stable in the long term. No matter whether the fixed period of time is long or short, it is impossible to precisely position a user status corresponding to a moment or a user status corresponding to a relatively short period of time. These desired features are inconsistent with the original intention of capturing and describing a user status change.

FIG. 1 is a schematic diagram of hardware entities performing information interaction in an embodiment of this application. FIG. 1 includes a terminal 1 and a server 2. The terminal 1 may include a plurality of terminals 11, 12, and 13, and perform information interaction with the server 2 in a wireless or wired manner. The quantity of servers in FIG. 1 is merely an example, and the quantity of servers is not limited.

In an information mining process, information such as a user status may be analyzed. The user status refers to a current interest and preference of a user, and generally changes fast and has certain randomness. If the user status can be captured precisely, precise services can be provided for the user. This is particularly applicable to an information recommendation scenario. The user status changes fast and has certain randomness. For example, at the time when Tiangong-1 space station was launched, even people usually not interested in aeronautics and astronautics were concerned about China aeronautics and astronautics. In another example, during the American presidential election, even people usually not interested in international politics are concerned about the election result. Therefore, it is difficult to capture a user status change sensitively while describing a user status accurately. In other words, it is difficult to precisely capture and describe the user status by using current information mining technology. Therefore, it is difficult to precisely capture the user status by using the related technology, and recommended information cannot be provided for the user precisely. In other words, in the information recommendation scenario, a user status cannot be obtained precisely by using the related technology. Therefore, as a less-than-ideal alternative, a user image is obtained and analyzed. However, the user image refers to a long-term interest and preference of a user, and tends to be stable in a long term. The analysis result of the user image is neither a data processing result expected by the user nor the best processing result Most of the users expect the service provider to describe the their user statuses more precisely and receive personalized information.

In the information recommendation scenario, an advertisement push scenario, and other scenarios, if the user status can be captured accurately, from a technical perspective, precision of information recommendation and targeted advertisement can be greatly improved and processing efficiency can also be improved. From the perspective of product application, it greatly helps to improve a predicted click-through rate of information recommendation and improve precision of information obtained by the user. However, in the related technology, a user image is established by using user behaviors in different periods. However, it is usually difficult to select an appropriate time period. If the selected time period for user behaviors is excessively long, for example, if a user image is established by using behaviors in one month or half a month, user status changes cannot be obtained sensitively. If the selected time period for user behaviors is excessively short, for example, if a user image is established by using behaviors in several hours, the amount of data may be excessively small, and a current status of the user cannot be described accurately.

In some embodiments, processing logic 10 is executed by a server, as shown in FIG. 1. The processing logic 10 includes S1, which describes establishing a user status queue according to first-type data and second-type data, and identifying each piece of user status information in the queue by using time information. The processing logic 10 also includes S2, which describes obtaining a user status feature according to the user status queue. The processing logic also includes S3, which describes inputting the user status feature and candidate data to an operation model, outputting a data processing result, and sending the data processing result to a terminal. In some embodiments, the user status is represented by using a dynamic time window-based user status queue; the user status can be captured precisely and described, thereby resolving the foregoing problem that cannot be resolved by the related technology.

In some embodiments, a time window for collecting user behaviors can further be adjusted dynamically according to an occurrence frequency of user behaviors, thereby achieving a balance between the sensitivity to user changes and the accuracy of user status representation.

The foregoing example of FIG. 1 is merely one system architecture example for implementing the embodiments of this application. The embodiments of this application are not limited to the system structure shown in FIG. 1. Embodiments of the method according to this application are proposed based on the system architecture in FIG. 1.

Figure 2:
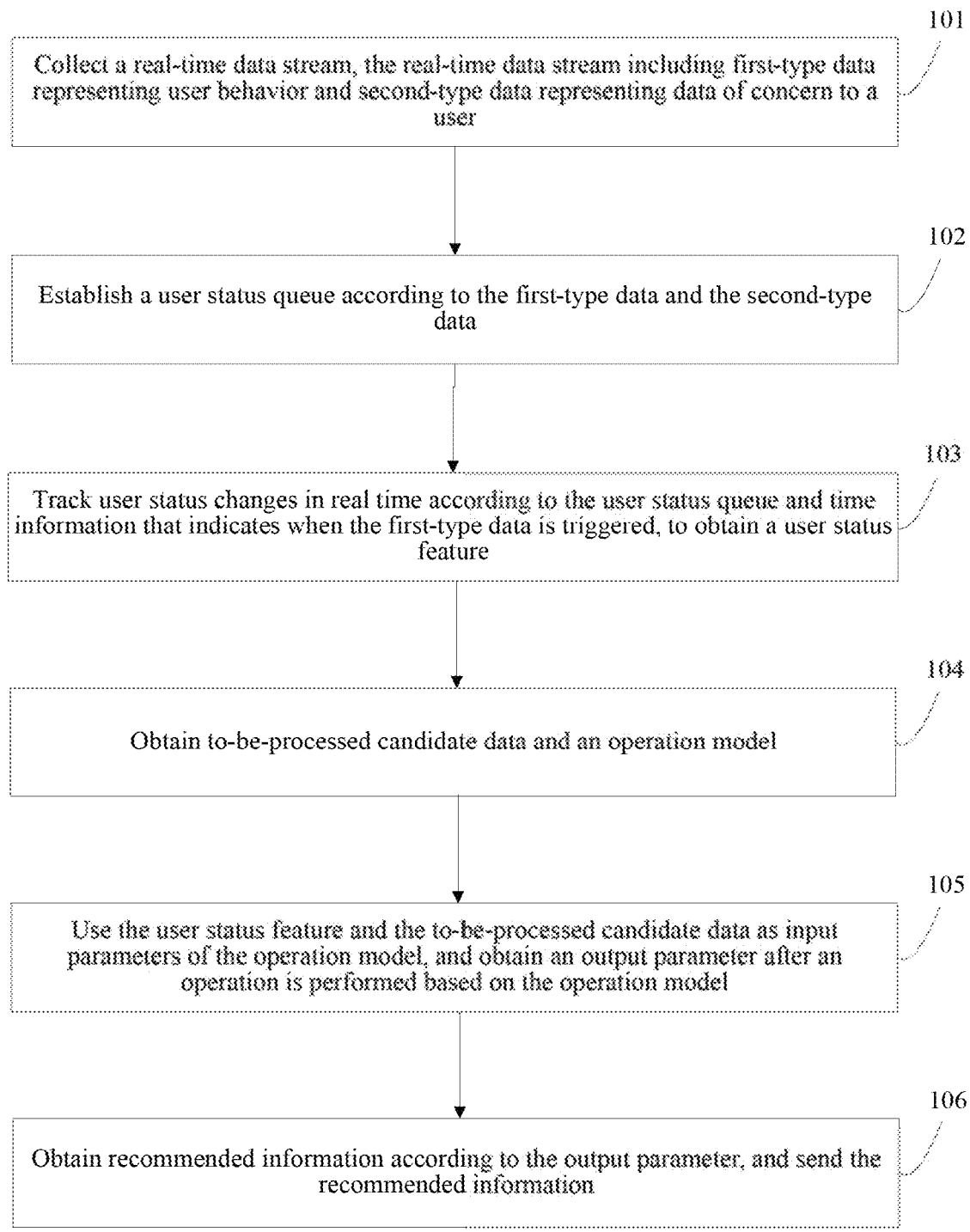
FIG. 2 is a schematic flowchart of an implementation of a method according to an embodiment of the present disclosure.

A data processing method according to an embodiment of this application is shown in FIG. 2. The method includes Step 101 which describes collecting a real-time data stream, the real-time data stream including first-type data representing user behaviors and second-type data representing data that a user is interested in. The first-type data may be various kinds of user behaviors generated corresponding to data that the user is interested in, including browser history such as clicking to browse news, commenting, collecting, forwarding. The second-type data may be data that the user is interested in, for example, a piece of news, a video, a novel, and the like. In this specification, the second-type data may be collectively referred to as "exposure data."

In some embodiments, the real-time data stream may be collected by using a distributed stream processing frame (such as Spark Streaming). By using Spark Streaming as the stream data processing frame, the following benefits are achieved: as a real-time calculation frame established on Spark, the stream data processing frame expands a large-scale stream data processing capability of Spark; by using abundant application program interfaces (APIs) provided by the stream data processing frame and a memory-based high-speed execution engine, the user can perform data processing by combining streaming, batch processing, and interactive query, to meet services that require high real-time performance, such as real-time recommendation and user behavior analysis. The stream data processing frame can perform multiple iterations on a data set quickly in a memory, and therefore supports complex data mining algorithms and graph computing algorithms. In addition to Spark Streaming, other stream processing frames may also be used as the stream data processing frame in some embodiments to implement the same function, and also fall within the protection scope of this application.

The data processing method according to this embodiment of this application further includes Step 102, which describes establishing a user status queue according to the first-type data and the second-type data, and Step 103, which describes tracking user status changes in real time according to the user status queue and time information that indicates when the first-type data is triggered/generated, to obtain a user status feature. Specifically, each piece of user status information in the user status queue may be identified according to the time information that indicates when the first-type data is triggered, to obtain each user status that is represented by a dynamic time window in the user status queue. In the structure of the user status queue, each piece of user status information in the user status queue is identified by using an occurrence time of a behavior. The structure of the user status queue not only includes the occurrence time of each behavior, but also includes behavior content. Specifically, the behavior content records an ID of news viewed by the user and a specific behavior performed by the user. For example, if the user only views the title of news 1 but does not click to enter a specific detail page, "news 1: exposed" is recorded. A specific time when the behavior occurs is recorded as the occurrence time of the behavior.

In some embodiments, the user status queue may be implemented by using the structure of the dynamic time window. Therefore, the user status queue may also be referred to as a dynamic time window-based user status queue. The queue includes two types of data: 1) an occurrence time of each behavior; and 2) behavior content. The occurrence time of the behavior may be implemented by using first-type data that represents a user behavior, and the time when the user behavior is triggered/generated is recorded. The behavior content may be implemented by using first-type data that represents the user behavior and second-type data that represents data that the user is interested in. A specific user behavior that occurs with respect to the second-type data is recorded. For example, a specific behavior (such as like, commenting, or forwarding) that occurs after the user views a video is recorded.

A user status feature is obtained according to the user status queue. The user status feature can be obtained by analyzing the user status. The user status feature is used for describing a signal or a variable of a current interest, preference, and subjective feeling of the user. In an example, the user status feature is generated according to the user status queue and can be classified into two types of features: 1) attribute statistical features; and 2) feedback features. Specifically, for the attribute statistical feature, first-level categories, second-level categories, keywords, tags, subjects, and titles of news corresponding to all news IDs in the user status queue are extracted, and are accumulated based on different behavior weights. For example, a weight of a click behavior is 1, a weight of a collection behavior is 1.5, a weight of a forwarding behavior is 2, and a weight is 0 if no behavior occurs. By using this method, first-level categories, second-level categories, keywords, tags, subjects, and titles of news with top 5 accumulated weights are used as a user preference feature. The feedback features may be further classified into a positive feedback feature and a negative feedback feature. An example of the positive feedback feature may be as follows: first-level categories, second-level categories, keywords, tags, subjects, and titles of 20 pieces of news (20 pieces of news are extracted if there are more than 20 pieces of news, and all pieces of news are extracted if there are less than 20 pieces of news) that are clicked by the user most recently within the latest half an hour are sorted in chronological order, and top 5 pieces of news are extracted as the positive feedback feature of the user. An example of the negative feedback feature is as follows: first-level categories, second-level categories, keywords, tags, subjects, titles, and the like of all news exposed and clicked by the user within the latest half an hour are accumulated based on the number of occurrence times, and top 10 pieces of news are extracted as the negative feedback feature.

As a result, after weights of different behaviors (clicking, sharing, and forwarding) corresponding to news categories are accumulated, the pieces of news are sorted according to priorities, and the top pieces of news are obtained. The top pieces of news are news with high news sensitivities. In the top pieces of news, news with top 5 news sensitivities is sorted based on time information, to obtain a positive feedback feature. In the top pieces of news, news with top 5 news sensitivities is sorted based on a number-of-times of being clicked on, to obtain a negative feedback feature. Further, embodiments may further include screening, sorting, and the like.

The data processing method according to some embodiments further includes Step 104 which describes obtaining to-be-processed candidate data and an operation model. The user status feature and the to-be-processed candidate data are used as input parameters of the operation model, and an output parameter after an operation is performed based on the operation model is obtained, as shown in Step 105. Using the information recommendation scenario as an example, the operation model may be a click-through rate prediction model, and a click-through rate can be obtained after an operation is performed on the user status feature based on the click-through rate prediction model. This embodiment is not limited to the information recommendation scenario, and is further applicable to a targeted advertising scenario, a search ranking scenario, and the like. A data processing result, such as recommended news, videos, and novels, is obtained according to the output parameter. Recommended information is obtained according to the output parameter, and the recommended information is sent to the terminal, as shown in Step 106. The recommended information is a type of information in the data processing result calculated based on the operation model in some embodiments.

In some embodiments, each piece of user status information in the user status queue can be identified by using time information. Therefore, a user status can be represented by using a user status queue having a dynamic time window, to precisely position a user status corresponding to a moment or a user status corresponding to a relatively short period of time, thereby meeting the original intention of the user. Based on the user status feature obtained from the user status queue, a precise data processing result can be obtained through an operation based on the operation model, and the data processing result is sent to a terminal, to provide more precise related services for the user.

In an example of this embodiment of this application, real-time news exposure data (news that is viewed by the user) and real-time behavior data of the user (clicking to browse the news, commenting, collecting, forwarding, and other behaviors performed by the user) may be accessed by using a distributed stream data processing frame (such as Spark Streaming or Storm). One user status information queue is established for each user for use in subsequent calculation of a user feature. Then, a user status feature is calculated according to the previously collected user status queue. Subsequently, information semaphores such as a news candidate set and the user status feature are input to an operation model, such as a click-through rate prediction model. In other words, the calculated user status feature, together with news information to be recommended, a user basic attribute, and the like, is input to the click-through rate prediction model (such as a logic regression or decomposition machine), and a predicted click-through rate of each piece of news to be recommended is output, so that the accuracy of click-through rate prediction is greatly improved. News that the user is most likely to be concerned about is calculated according to the predicted click-through rate of each piece of news to be recommended, to generate a final personalized news recommendation result, and the final recommended news is presented to the user.

In some embodiments, newly added first-type data is obtained while the real-time data stream is collected. For example, after the newly added user behavior data is obtained, a current user status queue is extracted, and second-type data (such as exposure data, where the newly added first-type data and the second-type data matching the newly added first-type data may correspond to the same piece of news, for example, the first-type data is a clicking behavior corresponding to news 1, and the second-type data is exposure data corresponding to news 1) corresponding to the newly added first-type data is located in the current user status queue. User status information corresponding to the located second-type data is deleted from the current user status queue. All user status information located after the deleted user status information is sequentially moved forward, and the current user status queue is updated. The newly added first-type data is added to the tail of the updated user status queue. As an example, real-time news exposure data and real-time user behavior data may be filled into/inserted the queue constantly. When user behavior data for which queue data updating is performed is a new piece of user behavior data, corresponding exposure data needs to be located in the user status queue first, and the piece of exposure data is moved out of the user status queue. Content located after this element in the user status queue is moved forward sequentially. Subsequently, the piece of user behavior data is inserted at the tail of the user status queue. For example, exposure data corresponding to news 1, specifically the exposure data corresponding to the newly-added user behavior data, is located in the user status queue, and the exposure data is deleted. There are two methods for searching for/locating the exposure data corresponding to the newly-added user behavior. The first method is based on data itself. For example, in the user status information in the user status queue, both the exposure data and the newly-added user behavior correspond to "news 1". The second method is based on a chronological order of occurrence times of behaviors corresponding to the data. For example, the newly-added user behavior data occurs at 13:45:20 on Oct. 21, 2015 corresponding to "news 1," and the exposure data occurs at 13:45:11 on Oct. 21, 2015 corresponding to "news 1." All elements after the deleted element are sequentially migrated. Herein, content in the user status queue is not distinguished, and may be sorted according to a chronological order of clicks performed by the user. Finally, the newly-added user behavior data is inserted at the tail of the new user status queue. In this specification, the "elements" in the user status queue are a plurality of user status information forming the user status queue.

In some embodiments, newly added second-type data is obtained while the real-time data stream is collected. For example, after the newly added exposure data is obtained, a current user status queue is extracted, the newly added second-type data is directly added to the tail of the current user status queue, and the current user status queue is updated. As an example, real-time news exposure data and real-time user behavior data may be filled into the queue constantly. When queue data updating is performed with respect to the real-time news exposure data, before the data stream is updated in real time to obtain the newly added exposure data, the original user status queue, that is, the current user status queue, is already established according to the prior first-type data and the prior second-type data. In this case, in the process of updating queue data with respect to the newly added exposure data, the exposure data is directly filled at the tail of the current user status queue.

In some embodiments, a real-time stream data connection may be established, to obtain in real time exposure data indicating news viewed by the user, and user behavior data indicating specific pages of news that the user has clicked to browse, news on which the user has commented, and news that the user has forwarded. Real-time news exposure data and real-time user behavior data may be filled into the user status constantly.

In some embodiments, a user status queue of an existing user is already stored in a storage medium. Herein, the storage medium includes various types of databases. Therefore, the user status queue of the existing user is directly retrieved from the storage medium. In other embodiments, for a new user, a new user status queue (or referred to as a dynamic time window-based user status representation queue) is created. The user status queue may be updated according to current data and a change in the queue. Subsequently, the updated user status queue is written into the storage medium.

In some embodiments, a queue update policy is configured. For example, for a queue length, when the first-type data (newly added user behavior data) and/or the second-type data (newly added exposure data) is updated in real time, updating of the current user status queue is triggered. When the queue length of the current user status queue reaches a first threshold, user status information located in the front of the current user status queue is sequentially deleted from the current user status queue, user status information located in the rear of the current user status queue is sequentially moved forward, and data updated in real time is inserted at the tail of the current user status queue. In another example, for the queue validity, when the first-type data (newly added user behavior data) and/or the second-type data (newly added exposure data) is updated in real time, updating of the current user status queue is triggered. First time information corresponding to user status information at the tail of the current user status queue is obtained. Validity of queue content in the current user status queue is determined according to a difference between the first time information and current time information, and all user status information in the current user status queue is cleared if the difference is greater than a second threshold.

In some embodiments, for the queue update policy of the user status queue, the queue update policy needs to ensure the sensitivity to changes in the interest and preference of the user, and also needs to ensure the accuracy. Therefore, the sensitivity and accuracy are ensured based on two aspects: the queue length and the queue validity time. In other words, for the user status queue, the queue length and the duration of validity of the queue content may be both limited, or either of the queue length and the duration of validity of the queue content may be limited.

For example, the queue length may be limited, so that the user status can be grasped accurately in real time. When the user has a high refresh frequency, the queue retains 100 browsing records of the user in the short term. When the user has a low refresh frequency, the queue retains 100 browsing records in the medium and long term. In this way, a dynamic time window mechanism is implemented, so that the representation of the user status changes as a user behavior frequency changes. For example, according to statistics about the user behavior data, 100 may be selected as the queue length. When newly-added data arrives and needs to be filled into the queue, if the queue already includes 100 elements, the earliest arriving element needs to be deleted from the queue, the following elements are migrated sequentially, and the newly added element is inserted at the tail of the queue.

Furthermore, the queue content may be associated with a time limitation. When a difference between the occurrence time of the last piece of data in the queue and the current time is greater than 24 hours, it may be determined that the user has stopped performing an operation for a period of time, and it is considered that the interest and preference of the user in this period of time are imperceptible. Therefore, to prevent data in the past from affecting prediction of the interest and preference of the user in the future, the queue may be cleared, to ensure the accuracy of the user status. In this regard, time validity of the queue content is limited, and the queue content is cleared when a difference between the occurrence time of the last element in the queue and the current time is greater than 24 hours.

It is noted that, this embodiment of this application is applicable to many scenarios. For example, the steps, idea, and processing logic in the foregoing embodiment of this application are applicable to a news recommendation scenario, a click-through rate prediction scenario, a targeted advertising scenario, a search ranking scenario, and the like.

Figure 3:
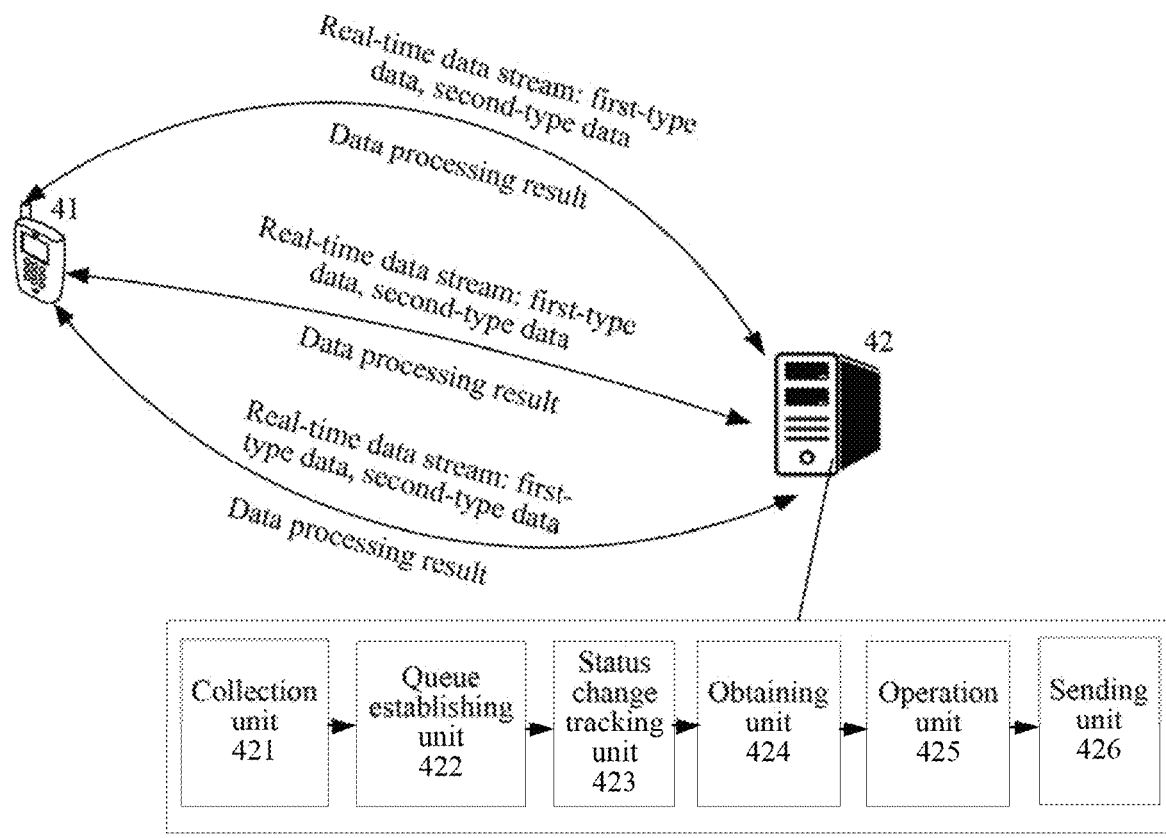
FIG. 3 is a schematic diagram of a system architecture according to an embodiment of the present disclosure.

As shown in FIG. 3, a data processing system, according to some embodiments, includes a terminal 41 and a server 42. The terminal 41 performs information interaction with the server 42 using wireless or wired communication. After collecting a real-time data stream from the terminal 41, the server 42 establishes a user status queue according to first-type data and second-type data in the real-time data stream, and tracks user status changes in real time according to the user status queue and time information that indicates when the first-type data is triggered, to obtain a user status feature. Specifically, each piece of user status information in the queue is identified by using the time information. The user status feature is obtained according to the user status queue. The user status feature and candidate data are input to an operation model, a data processing result (such as recommended information) is output, and the data processing result (such as the recommended information) is sent to the terminal 41. The recommended information is a type of information in the data processing result calculated based on the operation model in some embodiments.

In some embodiments, the server 42 includes:
a collection unit 421, configured to collect a real-time data stream, the real-time data stream including first-type data representing user behavior and second-type data representing data of interest to a user; a queue establishment unit 422, configured to establish a user status queue according to the first-type data and the second-type data; a status change tracking unit 423, configured to track user status changes in real time according to the user status queue and time information that indicates when the first-type data is triggered, to obtain a user status feature, where the status change tracking unit 423 specifically further includes a user status description sub-unit, configured to identify each piece of user status information in the user status queue according to the time information that indicates when the first-type data is triggered, to obtain each user status that is represented by a dynamic time window in the user status queue, and a feature determining sub-unit, configured to obtain the user status feature according to the user status queue; an obtaining unit 424, configured to obtain to-be-processed candidate data and an operation model; an operation unit 425, configured to use the user status feature and the to-be-processed candidate data as input parameters of the operation model, and obtain an output parameter after an operation is performed based on the operation model; and a sending unit 426, configured to obtain recommended information according to the output parameter, and send the recommended information to a terminal.

In some embodiments, the collection unit is further configured to obtain newly added second-type data when collecting the real-time data stream. The server further includes an extraction unit configured to extract a current user status queue, and an updating unit configured to directly add the newly added second-type data to the tail of the current user status queue, and update the current user status queue.

In some embodiments, the collection unit is further configured to obtain newly added first-type data when collecting the real-time data stream. The server further includes an extraction unit configured to extract a current user status queue, and an updating unit configured to search/locate the current user status queue for second-type data corresponding to the newly added first-type data, delete, from the current user status queue, user status information where the second-type data is located, sequentially move forward all user status information located after the deleted user status information, and update the current user status queue, and add the newly added first-type data to the tail of the updated user status queue.

In an implementation of this embodiment of this application, the server further includes a triggering unit configured to trigger updating of the current user status queue during real-time updating the first-type data and/or second-type data, and a first verification updating unit configured to sequentially delete user status information located in the front of the current user status queue from the current user status queue, sequentially move forward user status information located in the rear of the current user status queue, and insert data updated in real time to the tail of the current user status queue, when a queue length of the current user status queue reaches a first threshold.

In an implementation of this embodiment of this application, the server further includes a triggering unit configured to trigger updating of the current user status queue during real-time updating the first-type data and/or second-type data, and a first verification updating unit configured to obtain first time information corresponding to user status information at the tail of the current user status queue, determine validity of queue content in the current user status queue according to a difference between the first time information and current time information, and clear all user status information in the current user status queue if the difference is greater than a second threshold.

A computer readable storage medium according to an embodiment of this application stores a computer program, the computer program implementing steps of the data processing method in the foregoing embodiment when executed by a processor.

Figure 4:
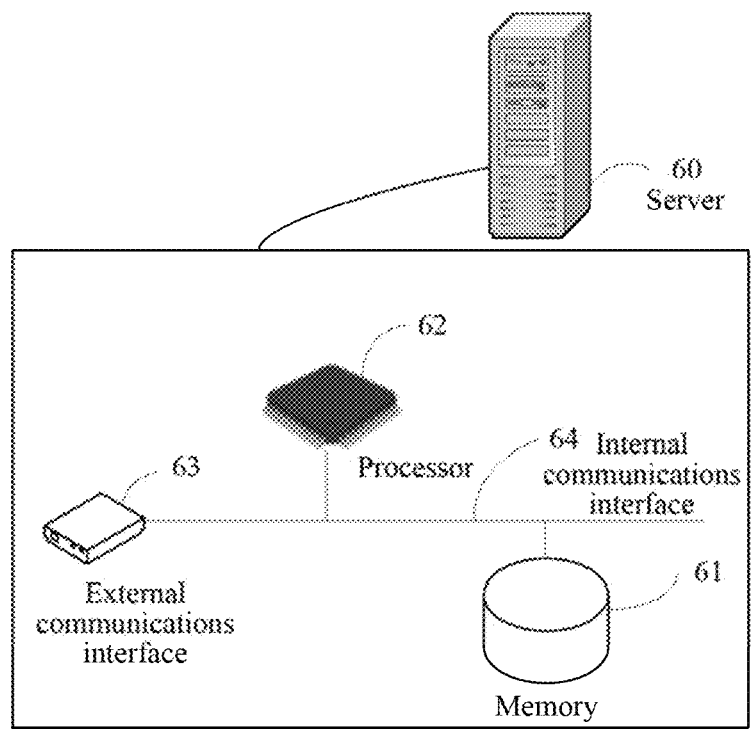
FIG. 4 is a schematic diagram of a hardware architecture of a server according to an embodiment of the present disclosure.

A server according to an embodiment of this application is shown in FIG. 4. The server 60 includes a memory 61 configured to store a computer program capable of running on a processor, and a processor 62 configured to perform steps of the data processing method in the foregoing embodiment when running the computer program. The server 60 may further include an external communications interface 63. The external communications interface 63 is configured to perform information interaction with a periphery such as a terminal. Specifically, for example, the server receives a real-time data stream sent by the terminal, establishes a user status queue according to first-type data and second-type data in the real-time data stream, and identifies each piece of user status information in the queue by using time information. The server 60 obtains a user status feature according to the user status queue, inputs the user status feature and candidate data into an operation model, output a data processing result, and sends the data processing result to the terminal. The server 60 may further include an internal communications interface 64. The internal communications interface 64 specifically may be a bus interface such as a PCI bus.

The embodiments of this application are illustrated as follows by using an implementation application scenario as an example.

The embodiments of this application are described by using a click-through rate prediction scenario in information recommendation as an example.

In the related technology, a user image is established by using user behaviors to describe an interest and a preference of a user. Specifically, the user image is established by using historical behavior data of the user in a fixed period of time. However, if a selected time period is excessively long (for example, one month), the sensitivity to user changes is not sufficient. If a selected time period is excessively short (for example, several hours or one day), statistics about user behaviors are not accurate enough. To achieve a balance between the sensitivity to and the accuracy of the current interest and preference of the user, in some embodiments, the user status is represented by using a dynamic time window-based user status queue, so that the current status of the user can be described precisely, thereby obtaining the interest, preference, and the like of the user.

Figures 5, 6:
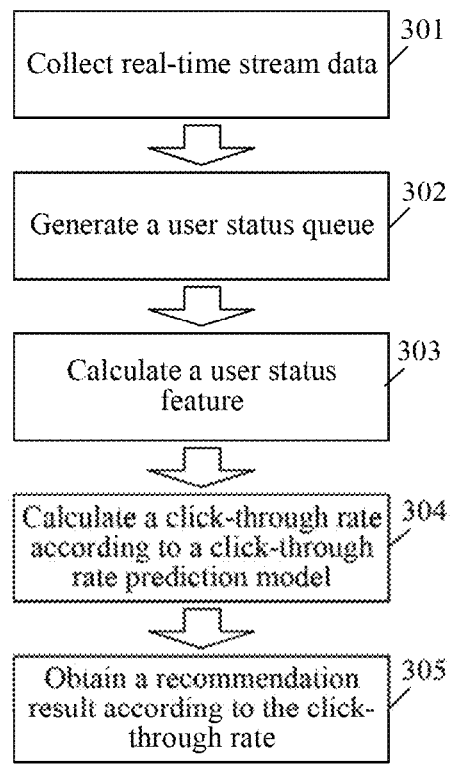
FIG. 5 is a schematic diagram of a click-through rate prediction process according to an embodiment of the present disclosure.
FIG. 6 is a schematic diagram of a user status queue according to an embodiment of the present disclosure.

A processing procedure according to an embodiment of this application is shown in FIG. 5, including the following steps.

In Step 301, real-time stream data is collected.

In Step 302, a user status queue is generated according to the real-time stream data.

In Step 303, a user status feature is calculated according to the user status queue.

In Step 304, the user status feature and candidate data are identified as an input in a click-through rate prediction model, and a click-through rate is calculated according to the click-through rate prediction model.

In Step 305, a recommendation result is obtained according to the click-through rate.

In some embodiments, the user status is described by using a user image in a fixed time period. If a selected time period is excessively long, the sensitivity to changes in the current interest and preference of the user is not sufficient. If a selected time period is excessively short, statistics about user behaviors are not accurate enough. To achieve a balance between the sensitivity to and the accuracy of the current interest and preference of the user, the user status is represented by using a dynamic time window-based user status representation queue.

The structure and update policy of the dynamic time window are described according to an embodiment of the present disclosure. First, the user status queue structure of the dynamic time window is described. Each element in the queue includes two parts of data, which are behavior content and an occurrence time. The behavior content records a news identifier (ID) viewed by the user and a specific behavior performed by the user. For example, if the user only views the title of news 1 but does not click to enter a specific detail page, "news 1: exposed" is recorded. A specific time when the behavior occurs is recorded as the occurrence time of the behavior. An example of the dynamic time window-based user status queue is shown in FIG. 6. FIG. 6 is an exemplary diagram of a dynamic time window-based user status queue.

Figures 10, 11:
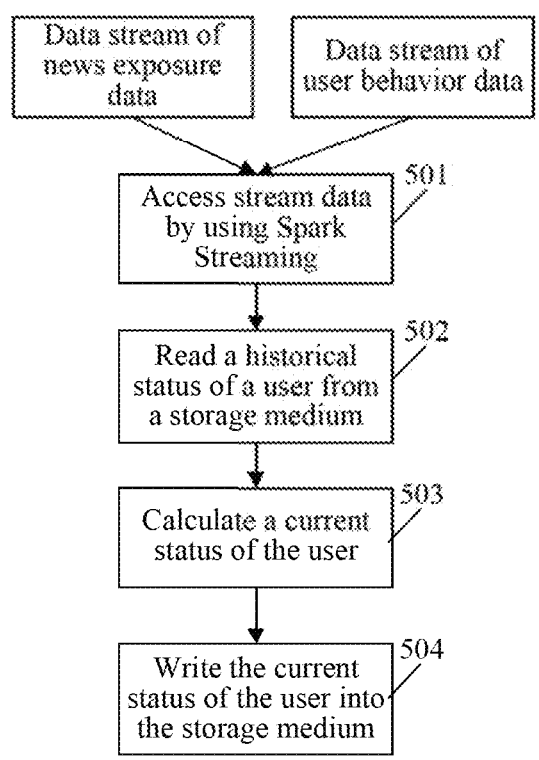
FIG. 10 is a schematic diagram of a user status queue according to an embodiment of the present disclosure.
FIG. 11 is a flowchart of user status storage according to an embodiment of the present disclosure.

Real-time news exposure data and real-time user behavior data are filled into the queue constantly. When exposure data is used, the exposure data is directly added to the tail of the queue. A process thereof is shown in FIG. 7. FIG. 7 is an exemplary diagram of inserting exposure data into a dynamic time window-based user status queue. An original queue identified with A1 includes three pieces of content. When a new piece of exposure data identified with A2 arrives, the new exposure data is directly added to the tail of the queue. When a new piece of user behavior data arrives, corresponding exposure data needs to be located in the user status queue first, and the piece of exposure data is removed from the user status queue. Content located after this element in the user status queue is moved forward sequentially. Finally, the piece of user behavior data is inserted at the tail of the queue. A process thereof is shown in FIG. 8. FIG. 8 is an exemplary diagram of inserting behavior data into a dynamic time window-based user status queue. As shown in FIG. 8, an original queue identified with A3 includes four pieces of content. When a new piece of user behavior data identified with A4 arrives, exposure data corresponding to news 3 is first located in the queue first, and then deleted. For example, user status information corresponding to news 3 is deleted (moved out, cleared, or the like) from the user status queue. Then, all elements located after the deleted element are sequentially migrated (content in the queue is not distinguished, and is sorted according to a chronological order of clicks performed by the user, that is, sorted according to the occurrence time), as shown in FIG. 9. Finally, the user behavior data is inserted at the tail of the queue, as shown in FIG. 10.

Furthermore, the update policy for the dynamic time window-based user status representation queue is described herein. The update policy needs to ensure the sensitivity to changes in the interest and preference of the user, and also needs to ensure the accuracy. The sensitivity and accuracy are ensured based on two aspects: a queue length and a queue validity time. For example, according to statistics about reading behaviors of the user on Tencent News and Daily Express, 100 is selected as the queue length. When newly-added data arrives and needs to be filled into the queue, if the queue already includes 100 elements, the earliest arriving element needs to be deleted from the queue, the following elements are migrated sequentially, and then the newly added element is inserted at the tail of the queue. Moreover, the queue content has a time limitation. When a difference between the occurrence time of the last element in the queue and the current time is greater than 24 hours, the queue content is cleared.

The following benefits are achieved by using the dynamic time window-based user status representation queue: The dynamic time window-based user status representation queue limits both the length and the validity time of the queue content. With the limitation on the length, the user status can be grasped accurately and in real time. When the user has a high refresh frequency, the queue retains 100 browsing records of the user in the short term. When the user has a low refresh frequency, 100 browsing records in the medium and long term are retained. In this way, a dynamic time window mechanism is implemented, so that the representation of the user status changes as a user behavior frequency changes. Secondly, when a difference between the occurrence time of the last piece of data in the queue and the current time is greater than 24 hours, it indicates that the user has stopped performing an operation using for a period of time, and it is considered that the interest and preference of the user in this period of time are imperceptible. Therefore, to prevent data in the past from affecting prediction of the interest and preference of the user in the future, the queue may be cleared to ensure the accuracy of the user status.

The user status is generated using the following steps.

In the first step, a real-time stream data connection is established, so that the system can obtain in real time news viewed by the user, detail pages of news that the user has clicked to browse, news on which the user has commented, or news that the user has forwarded. Real-time news exposure data and real-time user behavior data are filled into the user status. In the second step, if the user is an existing user, a status representation queue of the user retrieved from a storage medium (the storage medium herein includes various types of databases), and if the user is a new user, a dynamic time window-based user status representation queue is created. In the third step, the queue is updated according to current data and a queue condition. In the fourth step, the updated queue is written into the storage medium.

An example of a process of generating the user status is shown in FIG. 11, and includes the following steps.

In Step 501, stream data is accessed by using Spark Streaming, the stream data including a data stream of news exposure data and a data stream of user behavior data.

In Step 502, a historical status of a user is read from a storage medium.

In Step 503, a current status of the user is calculated.

In Step 504, the current status of the user is written into the storage medium.

Herein, in terms of system implementation of the process, Spark Streaming is used as a tool for accessing the real-time data stream. On the storage end, Redis may be used as the storage medium. Redis is a memory database with excellent performance, and is a database in a high-performance distributed storage system (key-value). Redis can ensure key/value data storage to the maximum extent, provide a high query speed, store a large amount of data, support high concurrency, and achieve a good supplement function for a relational database in some cases. Redis supports storage of more value types, including data types such as a string, a list, a set, and hashes. These data types support various operations. On this basis, Redis supports various sorting manners. To ensure efficiency, all data is buffered in the memory. Redis periodically writes updated data into a magnetic disk or writes a modification operation into an additional record file.

A user status feature is generated according to the user status queue. Currently, the user status feature can be classified into two types of features: attribute statistical features, and feedback features. First, the attribute statistical features are implemented as follows. First-level categories, second-level categories, keywords, tags, subjects, and titles of news corresponding to all news IDs in the user status queue are extracted, and are accumulated based on different behavior weights. For example, a weight of a click behavior is 1, a weight of a collection behavior is 1.5, a weight of a forwarding behavior is 2, and a weight is 0 if no behavior occurs. By using this method, first-level categories, second-level categories, keywords, tags, subjects, and titles of news with top 5 accumulated weights are used as a user preference feature. Second, the feedback features are implemented as follows. The feedback features are classified into a positive feedback feature and a negative feedback feature. The negative feedback feature is implemented as follows. First-level categories, second-level categories, keywords, tags, subjects, titles, and the like of all news exposed and clicked by the user within the latest half an hour are accumulated based on the number of occurrence times, and top 10 pieces of news are extracted as the feature. The positive feedback feature is implemented as follows. First-level categories, second-level categories, keywords, tags, subjects, and titles of 20 pieces of news (20 pieces of news are extracted if there are more than 20 pieces of news, and all pieces of news are extracted if there are less than 20 pieces of news) that are clicked by the user most recently within the latest half an hour are sorted in chronological order, and top 5 pieces of news are extracted as the positive feedback feature of the user.

A click-through rate is predicted based on a click model.

The input of a click-through rate prediction model (such as a logic regression or decomposition machine) may be the user status feature calculated above, together with news information to be recommended, a user basic attribute, and the like, and an output may be the predicted click-through rate of each piece of news to be recommended.

As a result, a news recommendation result is generated as an output and final recommended news is presented to the user based primarily on the predicted click-through rate of each piece of news in the foregoing step and with reference to a service rule.

In the several embodiments provided in this application, it is understood that the disclosed device and method may be implemented in other manners. The described device embodiments are merely exemplary. For example, the unit division is merely logical function division and may be other division in actual implementation. For example, a plurality of units or components may be combined, or may be integrated into another system, or some features may be ignored or not performed. In addition, the displayed or discussed mutual couplings or direct couplings or communication connections between components may be implemented through some interfaces. The indirect couplings or communication connections between the devices or units may be implemented in electronic, mechanical, or other forms.

The units described as separate parts above may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be all integrated into one processing unit, or each of the units may exist alone physically, or two or more units may be integrated into one unit. The integrated unit may be implemented in a hardware form or in a form of hardware plus a software functional unit.

A person of ordinary skill in the art may understand that all or some of the steps of the foregoing method embodiments may be implemented by a program instructing relevant hardware. The program may be stored in a computer readable storage medium. During execution of the program, the steps of the foregoing method embodiments are performed. The storage medium includes any medium that can store program code, such as a mobile storage device, a read-only memory (ROM), a random access memory (RAM), a magnetic disk, or an optical disc.

Alternatively, when the foregoing integrated unit in this application is implemented in a form of a software functional unit and sold or used as an independent product, the integrated unit may be stored in a computer-readable storage medium. Based on such an understanding, the technical solutions of this application essentially, or the part contributing to the prior art, may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a mobile storage device, a ROM, a RAM, a magnetic disk, or an optical disc.

The foregoing descriptions are merely specific implementations of this embodiment, but are not intended to limit the protection scope of this application. Any variation or replacement readily figured out by a person skilled in the art within the technical scope disclosed in this application falls within the protection scope of this application. Therefore, the protection scope of this application is subject to the protection scope of the appended claims.

INDUSTRIAL APPLICABILITY

By using the embodiments of this application, a real-time data stream is collected, a user status queue is established according to the real-time data stream, and user status changes are tracked in real time according to the user status queue and time information indicating when the first-type data is triggered, to obtain a user status feature, thereby dynamically grasping (for example, tracking each user status in the queue) user status changes (such as a dynamic time window) in real time (for example, based on the real-time data stream). A user status corresponding to a moment or a user status change corresponding to a relatively short period of time can be positioned precisely. Even though the user status changes fast and has certain randomness, the user status can still be captured precisely, thereby providing recommended information for a user precisely, and providing more precise related services for the user.

What is claimed is:

1. A data processing method, comprising:
    collecting, by a server, a real-time data stream, the real-time data stream including a plurality of usage data for a plurality of content, each of the plurality of usage data indicating (i) content identification information of a respective one of the plurality of content, (ii) one of a plurality of user actions that is performed on the respective one of the plurality of content, and (iii) a time stamp of the respective user action, each of the plurality of user actions being assigned to a behavior weight;
    generating a user status queue according to the plurality of usage data and the content identification information of the plurality of content, each of a plurality of queue elements of the user status queue including a respective one of the plurality of usage data and the content identification information indicated by the respective one of the plurality of usage data, the user status queue being arranged based on the time stamps of the plurality of user actions indicated by the plurality of usage data;
    limiting the generated user status queue by
    limiting a length of the generated user status queue by removing usage data having an earliest time stamp from the user status queue when a number of queue elements in the generated user status queue exceeds a threshold number, and
    limiting a validity duration of the generated user status queue by removing, from the user status queue, all usage data in which a difference between first time information of the respective usage data and current time information is greater than a validity duration threshold, wherein the removing all usage data outside the validity duration threshold is performed independently of the length of the user status queue;
    determining a user status feature according to the content identification information indicated by usage data included in the limited user status queue and the behavior weights assigned to the user actions indicated by the usage data included in the limited user status queue;
    determining recommended information according to the user status feature; and
    sending the recommended information to a user terminal.

2. The method according to claim 1, wherein the determining the user status feature comprises:
    identifying, within a dynamic time window, a subset of the plurality of queue elements in the user status queue according to the time stamps indicated by the usage data included in the subset of the plurality of queue elements; and
    determining the user status feature according to the content identification information indicated by the usage data included in the subset of the plurality of queue elements in the user status queue.

3. The method according to claim 1, further comprising:
    obtaining newly added usage data; and
    adding a queue element including the newly added usage data and content identification information indicated by the newly added usage data to a tail of the user status queue.

4. The method according to claim 3, wherein the adding comprises:
    determining whether the content identification information indicated by the newly added usage data is included in the user status queue;
    deleting one of the queue elements in the user status queue based on the content identification information indicated by the newly added usage data being included in the user status queue, the one of the queue elements including the content identification information indicated by the newly added usage data;
    updating the user status queue by sequentially moving forward the queue elements located after the deleted queue element in the user status queue; and
    adding the queue element including the newly added usage data and the content identification information indicated by the newly added usage data to the tail of the updated user status queue.

5. The method according to claim 1, wherein, when the number of queue elements in the generated user status queue is equal to the threshold number, the method further comprises:
    obtaining newly added usage data;
    deleting one of the queue elements in the user status queue, the one of the queue elements being located in a front of the user status queue;
    updating the user status queue by sequentially moving forward the other queue elements in the user status queue; and
    inserting a queue element including the newly added usage data and content identification information indicated by the newly added usage data at a tail of the updated user status queue.

6. The method according to claim 1, wherein the limiting the validity duration comprises:
    obtaining a time stamp indicated by one of the plurality of usage data included in a queue element located at a tail of the generated user status queue;
    determining a difference between the time stamp indicated by the one of the plurality of usage data included in the queue element located at the tail of the generated user status queue and the current time information; and removing all queue elements in the generated user status queue in response to the difference being greater than the validity duration threshold.

7. A server, comprising:

processing circuitry configured to:

collect, by a server, a real-time data stream, the real-time data stream including a plurality of usage data for a plurality of content, each of the plurality of usage data indicating (i) content identification information of a respective one of the plurality of content, (ii) one of a plurality of user actions that is performed on the respective one of the plurality of content, and (iii) a time stamp of the respective user action, each of the plurality of user actions being assigned to a behavior weight;

generate a user status queue according to the plurality of usage data and the content identification information of the plurality of content, each of a plurality of queue elements of the user status queue including a respective one of the plurality of usage data and the content identification information indicated by the respective one of the plurality of usage data, the user status queue being arranged based on the time stamps of the plurality of user actions indicated by the plurality of usage data;

limit the generated user status queue by limiting a length of the generated user status queue by removing usage data having an earliest time stamp from the user status queue when a number of queue elements in the generated user status queue exceeds a threshold number, and limiting a validity duration of the generated user status queue by removing, from the user status queue, all usage data in which a difference between a time stamp of the respective usage data and current time information is greater than a validity duration threshold, wherein the removing all usage data outside the validity duration threshold is performed independently of the length of the user status queue;

determine a user status feature according to the content identification information indicated by usage data included in the limited user status queue and the behavior weights assigned to the user actions indicated by usage data included in the limited user status queue;

determine recommended information according to the user status feature; and send the recommended information to a user terminal.

8. The server according to claim 7, wherein the processing circuitry is further configured to:

identify, within a dynamic time window, a subset of the plurality of queue elements in the user status queue according to the time stamps indicated by the usage data included in the subset of the plurality of queue elements; and determine the user status feature according to the content identification information indicated by the usage data included in the subset of the plurality of queue elements in the user status queue.

9. The server according to claim 7, wherein the processing circuitry is further configured to:

obtain newly added usage data; and add a queue element including the newly added usage data and content identification information indicated by the newly added usage data to a tail of the user status queue.

10. The server according to claim 9, wherein the processing circuitry is further configured to:

determine whether the content identification information indicated by the newly added usage data is included in the user status queue;

delete one of the queue elements in the user status queue based on the content identification information indicated by the newly added usage data being included in the user status queue, the one of the queue elements including the content identification information indicated by the newly added usage data;

update the user status queue by sequentially moving forward the queue elements located after the deleted queue element in the user status queue; and add the queue element including the newly added usage data and the content identification information indicated by the newly added usage data to the tail of the updated user status queue.

11. The server according to claim 7, wherein, when the number of queue elements in the generated user status queue is equal to the threshold number, the processing circuitry is further configured to:

obtain newly added usage data;

delete one of the queue elements in the user status queue, the one of the queue elements being located in a front of the user status queue;

update the user status queue by sequentially moving forward the other queue elements in the user status queue; and insert a queue element including the newly added usage data and content identification information indicated by the newly added usage data at tail of the updated user status queue.

12. The server according to claim 7, wherein the processing circuitry is further configured to:

obtain a time stamp indicated by one of the plurality of usage data included in a queue element located at a tail of the generated user status queue;

determine a difference between the time stamp indicated by the one of the plurality of usage data included in the queue element located at the tail of the generated user status queue and the current time information; and remove all queue elements in the generated user status queue in response to the difference being greater than the validity duration threshold.

13. The data processing method according to claim 1, the method being performed by the server, the server comprising one or more processors, a memory, and one or more programs, the one or more programs comprising one or more units that each corresponds to one group of instructions, the one or more processors being configured to execute the instructions.

14. A server, comprising:

a memory, configured to store a computer program running on a processor; and the processor configured to perform the method according to claim 1 when running the computer program.

15. A non-transitory computer-readable medium storing a program executable by a processor to perform:

collecting, by a server, a real-time data stream, the real-time data stream including a plurality of usage data for a plurality of content, each of the plurality of usage data indicating (i) content identification information of a respective one of the plurality of content, (ii) one of a plurality of user actions that is performed on the respective one of the plurality of content, and (iii) a time stamp of the respective user action, each of the plurality of user actions being assigned to a behavior weight;

generating a user status queue according to the plurality of usage data and the content identification information of the plurality of content, each of a plurality of queue elements of the user status queue including a respective one of the plurality of usage data and the content identification information indicated by the respective one of the plurality of usage data, the user status queue being arranged based on the time stamps of the plurality of user actions indicated by the plurality of usage data;

limiting the generated user status queue by
  limiting a length of the generated user status queue by removing usage data having an earliest time stamp from the user status queue when a number of queue elements in the generated user status queue exceeds a threshold number, and
  limiting a validity duration of the generated user status queue by removing, from the user status queue, all usage data in which a difference between a time stamp of the respective usage data and current time information is greater than a validity duration threshold, wherein the removing all usage data outside the validity duration threshold is performed independently of the length of the user status queue;

determining a user status feature according to the content identification information indicated by usage data included in the limited user status queue and the behavior weights assigned to the user actions indicated by the usage data included in the limited user status queue;

determining recommended information according to the user status feature; and sending the recommended information to a user terminal.

16. The non-transitory computer-readable medium according to claim 15, wherein the stored program is further executable by the processor to perform:
  identifying, within a dynamic time window, a subset of the plurality of queue elements in the user status queue according to the time stamps indicated by the usage data included in the subset of the plurality of queue elements; and
  determining the user status feature according to the content identification information indicated by the usage data included in the subset of the plurality of queue elements in the user status queue.

17. The non-transitory computer-readable medium according to claim 15, wherein the stored program is further executable by the processor to perform:

obtaining newly added usage data; and
  adding a queue element including the newly added usage data and content identification information indicated by the newly added usage data to a tail of the user status queue.

18. The non-transitory computer-readable medium according to claim 17, wherein the stored program is further executable by the processor to perform:
  determining whether the content identification information indicated by the newly added usage data is included in the user status queue;
  deleting one of the queue elements in the user status queue based on the content identification information indicated by the newly added usage data being included in the user status queue, the one of the queue elements including the content identification information indicated by the newly added usage data;
  updating the user status queue by sequentially moving forward the queue elements located after the deleted queue element in the user status queue; and
  adding the queue element including the newly added usage data and the content identification information indicated by the newly added usage data to the tail of the updated user status queue.

19. The non-transitory computer-readable medium according to claim 15, wherein, when the number of queue elements in the generated user status queue is equal to the threshold number, the stored program is further executable by the processor to perform:
  obtaining newly added usage data;
  deleting one of the queue elements in the user status queue, the one of the queue elements being located in a front of the user status queue;
  updating the user status queue by sequentially moving forward the other queue elements in the user status queue; and
  inserting a queue element including the newly added usage data and content identification information indicated by the newly added usage data at a tail of the updated user status queue.

20. The non-transitory computer-readable medium according to claim 15, wherein the stored program is further executable by the processor to perform:
  obtaining a time stamp indicated by one of the plurality of usage data included in the queue element located at a tail of the generated user status queue;
  determining a difference between the time stamp indicated by the one of the plurality of usage data included in the queue element located at the tail of the generated user status queue and the current time information; and
  removing all queue elements in the generated user status queue in response to the difference being greater than the validity duration threshold.

* * * * *